(12) United States Patent
Bartlett et al.

(10) Patent No.: US 8,733,590 B2
(45) Date of Patent: May 27, 2014

(54) FUEL OR DEF DISPENSER HAVING FLUID TEMPERATURE CONDITIONING AND CONTROL SYSTEM

(75) Inventors: Jack Francis Bartlett, Summerfield, NC (US); Jonathan E. Deline, Oak Ridge, NC (US); John E. Ingold, Greensboro, NC (US); Michael Lawrence Jennings, Billericay (GB)

(73) Assignee: Gilbarco, Inc., Greensboro, NC (US)

( * ) Notice: Subject to any disclaimer, the term of this patent is extended or adjusted under 35 U.S.C. 154(b) by 420 days.

(21) Appl. No.: 12/843,976

(22) Filed: Jul. 27, 2010

(65) Prior Publication Data
US 2012/0024892 A1 Feb. 2, 2012

(51) Int. Cl.
*B67D 1/00* (2006.01)
(52) U.S. Cl.
USPC ............ 222/54; 222/146.1; 222/71; 222/318; 222/146.2; 222/146.6; 222/1; 165/287
(58) Field of Classification Search
USPC .......... 222/141, 54, 146.1, 146.5, 146.6, 318, 222/71, 72, 73, 74, 75, 1; 141/83; 165/255, 165/287, 289
See application file for complete search history.

(56) References Cited

U.S. PATENT DOCUMENTS

| | | | |
|---|---|---|---|
| 3,762,428 A | 10/1973 | Beck et al. | |
| 3,901,197 A | 8/1975 | Noguchi et al. | |
| 3,939,858 A | 2/1976 | LeMay | |
| 4,171,034 A * | 10/1979 | Gallant | 184/6.24 |
| 4,260,000 A | 4/1981 | McGahey et al. | |
| 4,499,885 A | 2/1985 | Weissenbach et al. | |
| 4,614,438 A | 9/1986 | Kobayashi | |
| 4,705,082 A | 11/1987 | Fanshawe et al. | |
| 4,831,866 A * | 5/1989 | Forkert et al. | 73/1.27 |
| 4,876,653 A | 10/1989 | McSpadden et al. | |
| 5,029,100 A | 7/1991 | Young et al. | |
| 5,038,971 A | 8/1991 | Gayer et al. | |
| 5,156,199 A * | 10/1992 | Hartsell et al. | 141/83 |

(Continued)

FOREIGN PATENT DOCUMENTS

EP 0733796 9/1996

OTHER PUBLICATIONS

International Search Report and Written Opinion of corresponding application No. PCT/US2011/044950 mailed Dec. 22, 2011.

(Continued)

*Primary Examiner* — Frederick C Nicolas
*Assistant Examiner* — Bob Zadeh
(74) *Attorney, Agent, or Firm* — Nelson Mullins Riley & Scarborough LLP

(57) ABSTRACT

A fluid dispenser has a housing in which fluid flow control components are located and a fluid conduit completing a fluid flow path between a fluid storage tank and a nozzle coupled to the housing. The fluid dispenser further has a control system, at least one controllable valve and a fluid flow meter located along the fluid flow path. The fluid dispenser further has a fluid temperature conditioning subsystem located along the fluid flow path upstream of the flow meter. The control system selectively operates the fluid temperature conditioning subsystem upon detection of a predetermined temperature. At least one controllable recirculation valve may also be provided, and the control system may selectively actuate the controllable recirculation valve such that the fluid flows back to the fluid storage tank. A method of measuring the flow rate of a fluid in the fluid dispenser is also disclosed.

23 Claims, 6 Drawing Sheets

(56) References Cited

U.S. PATENT DOCUMENTS

| | | | |
|---|---|---|---|
| 5,163,586 A | 11/1992 | Zinsmeyer | |
| 5,170,361 A | 12/1992 | Reed | |
| 5,360,139 A | 11/1994 | Goode | |
| 5,362,965 A | 11/1994 | Maggard | |
| 5,363,988 A * | 11/1994 | Saxton et al. | 222/14 |
| 5,557,084 A * | 9/1996 | Myers et al. | 235/94 A |
| 5,578,090 A | 11/1996 | Bradin | |
| 5,630,528 A | 5/1997 | Nanaji | |
| 5,782,275 A * | 7/1998 | Hartsell et al. | 141/94 |
| 5,848,640 A * | 12/1998 | Liu | 165/255 |
| 5,979,794 A | 11/1999 | DeFillipi et al. | |
| 6,006,775 A | 12/1999 | Negley, III | |
| 6,112,134 A | 8/2000 | Terranova et al. | |
| 6,325,112 B1 | 12/2001 | Nanaji | |
| 6,419,856 B1 | 7/2002 | Cirrito et al. | |
| 6,554,031 B2 * | 4/2003 | Channing | 141/9 |
| 6,681,811 B2 | 1/2004 | Channing | |
| 6,705,534 B1 | 3/2004 | Mueller | |
| 6,851,628 B1 | 2/2005 | Garrison et al. | |
| 6,899,149 B1 * | 5/2005 | Hartsell et al. | 141/192 |
| 6,929,038 B2 * | 8/2005 | Nanaji | 141/67 |
| 6,978,661 B2 | 12/2005 | Hutchinson et al. | |
| 7,000,651 B2 | 2/2006 | Fink, Jr. et al. | |
| 7,028,561 B2 * | 4/2006 | Robertson et al. | 73/861.79 |
| 7,178,561 B2 | 2/2007 | Memmott et al. | |
| 7,222,647 B2 | 5/2007 | Bingham et al. | |
| 7,328,726 B2 | 2/2008 | Cohen et al. | |
| 7,555,935 B2 | 7/2009 | Baillargeon et al. | |
| 8,352,071 B2 | 1/2013 | Winsness | |
| 2001/0034567 A1 | 10/2001 | Allen et al. | |
| 2004/0163726 A1 * | 8/2004 | Nanaji | 141/67 |
| 2004/0188424 A1 * | 9/2004 | Thomas et al. | 219/632 |
| 2005/0055874 A1 | 3/2005 | Bekemeyer | |
| 2005/0132640 A1 | 6/2005 | Kelly et al. | |
| 2007/0169837 A1 | 7/2007 | Cohen et al. | |
| 2007/0210075 A1 * | 9/2007 | Self et al. | 219/628 |
| 2008/0014103 A1 | 1/2008 | Cooke | |
| 2008/0092983 A1 | 4/2008 | Larsson et al. | |
| 2008/0289720 A1 | 11/2008 | Takano et al. | |
| 2009/0087806 A1 * | 4/2009 | Zuzek et al. | 432/29 |
| 2009/0159057 A1 * | 6/2009 | Pursifull et al. | 123/575 |
| 2009/0293989 A1 | 12/2009 | Yang et al. | |
| 2010/0139782 A1 * | 6/2010 | Deline et al. | 137/87.03 |
| 2011/0036861 A1 * | 2/2011 | Hillel et al. | 222/54 |

OTHER PUBLICATIONS

Gilbarco Inc., SK700-11 is now available with AdBlue(TM), Press Release, Gilbarco Inc., http://www.gilbarco.eu/en/press_5.aspx, Aug. 24, 2008.

Gilbarco Inc., Frequently Asked Questions: Gilbarco® Encore® S Diesel Exhaust Fluid (DEF) Dispenser, mikebuckmaster.com, http://mikebuckmaster.com/Documents/DEF%20FAQ.pdf.,Oct. 2009.

Mike Antich, DEF: A New Variable in Truck Fleets, Work Truck Magazine, Bobit Business Media, United States, Jan.-Feb. 2010.

Don Gilson, Storage & Dispensing of DEF, 6 Tough Issues, PEI Journal, Fourth Quarter 2009.

Dresser Inc., Dresser® Wayne® Diesel Exhaust Fluid Dispensers Allow for Quick and Easy DEF Bulk Filling at Truck Stops and Large Fleet Sites, Press Release, Mar. 17, 2010, Environmental Expert. com.

Chad Johnson, Diesel Exhaust Fluid (DEF), White Paper, Sep. 2009, Gilbarco Inc.

Gilbarco Inc., Encore® S Diesel Exhaust Fluid (DEF) Dispenser, Brochure, 2009.

* cited by examiner

FUEL OR DEF DISPENSER HAVING FLUID TEMPERATURE CONDITIONING AND CONTROL SYSTEM

FIELD OF THE INVENTION

The present invention relates generally to fuel dispensers, diesel exhaust fluid dispensers, and other such dispensers. More specifically, the invention provides a system for temperature conditioning and control of a fluid, such as liquid fuel or diesel exhaust fluid, in a fluid dispenser.

BACKGROUND OF THE INVENTION

Various countries have environmental regulations for vehicles which limit emissions of certain compounds, such as nitrogen oxide. For example, some regulations require that many newly-manufactured diesel-powered vehicle engines significantly reduce nitrogen oxide levels. One technology addressing this concern is selective catalytic reduction (SCR), which involves dosing a reductant into engine exhaust upstream of a catalyst to convert nitrogen oxides into less harmful byproducts. Diesel exhaust fluid (DEF) is a generic term for a reductant that may be used in the process of SCR. An example of a common reductant is a 32.5% solution of aqueous urea.

Because many manufacturers have adopted SCR technology, SCR systems will often be installed on new diesel vehicles. Correspondingly, diesel vehicles may now incorporate special DEF tanks, and DEF dispensers are increasingly provided in retail service station environments.

However, DEF will crystallize and freeze at a relatively high temperature (approximately 12° F.) compared to liquid fuels such as gasoline. In addition, DEF expands approximately 7% when frozen. This expansion can cause damage to the internal components of a DEF dispenser.

One prior art solution to this problem involves mounting a 750 W/120V electric heater in a DEF dispenser's lower hydraulic cabinet adapted to turn on when the ambient temperature in the cabinet reaches a specified level (e.g., 41° F.). Likewise, the solution may involve providing DEF dispensers with a retractable dispensing hose that is stowed in the dispenser's cabinet and a sliding cover or access door over the dispenser nozzle. Alternatively, the DEF dispenser may be adapted to suspend operation if the ambient temperature in the hydraulic cabinet reaches 12° F. while the power is energized to prevent damage to the dispenser's fuel handling components.

Temperature effects have also presented problems in prior art liquid fuel dispensers. Liquid fuel dispensers are well known, and these dispensers include flow meters that measure volumetric flow rate of liquid fuel as it is dispensed. Such flow meters are typically required to comply with weights and measures regulatory requirements that mandate a high level of accuracy. This ensures that the customer is neither overcharged nor undercharged for the purchase. Typically, either positive displacement meters or inferential meters have been used for this purpose.

The volume of liquid fuel is somewhat dependent on temperature (i.e., it expands when heated and contracts when cooled). In addition, liquid fuels are typically sold by a volumetric measure, such as U.S. gallons. Prior art solutions provide temperature compensation by sending signals from thermometric probes located in a flow meter to a first circuit in the dispenser's lower fuel handling compartment, to a second circuit in the dispenser's upper electronics compartment via an intrinsically safe connection, and finally to a computation device designed to combine the temperature data and pulser data. The computation device employs a volume correction factor to compensate the pulser data so as to account for temperature variations. Detailed information regarding temperature compensation of dispensed fuel is disclosed in U.S. Pat. No. 5,557,084 to Myers et al., entitled "Temperature Compensating Fuel Dispenser," the entire disclosure of which is incorporated herein by reference for all purposes. However, this solution may not be available in many markets due to government regulation.

SUMMARY OF THE INVENTION

According to one aspect, the present invention provides a fluid dispenser for installation in a forecourt in a fueling environment for dispensing fluid from at least one fluid storage tank remote from the fluid dispenser into a vehicle. The fluid dispenser comprises a housing in which fluid flow control components are located and piping defining a fluid flow path between the at least one fluid storage tank and a nozzle coupled to the housing. Further, the fluid dispenser comprises at least one controllable valve in the fluid flow path, and a fluid flow meter located along the fluid flow path. Finally, the fluid dispenser comprises a fluid temperature conditioning subsystem located along the fluid flow path upstream of the fluid flow meter in the housing.

According to another aspect, the present invention provides a fluid dispenser for dispensing fluid from at least one fluid storage tank into a vehicle. The fluid dispenser comprises a housing in which fluid flow control components are located and a control system. Also, the fluid dispenser comprises a first fluid conduit completing a first flow path between the at least one fluid storage tank and a nozzle coupled to the housing and a second fluid conduit completing a second flow path between the nozzle and the at least one fluid storage tank. Further, a controllable valve is located along the second flow path. The temperature of flowing fluid is conditioned inside the fluid dispenser housing and the control system is adapted to selectively actuate the controllable valve such that the flowing fluid flows to the at least one fluid storage tank when the fluid dispenser is not in use.

In another aspect, the present invention provides a fluid dispenser for dispensing fluid from at least one fluid storage tank into a vehicle. The fluid dispenser comprises a housing in which fluid flow control components are located and a control system. A first fluid conduit is adapted for fluid communication with a nozzle coupled to the housing and completes a first flow path through the fluid dispenser. A second fluid conduit is adapted for fluid communication with the nozzle and completes a second flow path through the fluid dispenser. The fluid dispenser also comprises a junction at which the first fluid conduit and the second fluid conduit are in fluid communication with each other, the junction being spaced apart from the nozzle. The junction further defines an inlet for connection to the at least one fluid storage tank. A valve is in fluid communication with the inlet upstream of the junction and a recirculation pump is coupled to the second fluid conduit. Finally, the control system is adapted to actuate the valve and the recirculation pump such that fluid recirculates through the housing when the fluid dispenser is not in use.

According to another aspect, the present invention provides a fluid dispenser for dispensing a first fluid from at least one fluid storage tank into a vehicle. The fluid dispenser comprises a housing in which fluid flow control components are located and a control system. A first fluid conduit completes a first flow path between the at least one fluid storage tank and a nozzle coupled to the housing, and a second fluid conduit completes a second flow path between the nozzle and the at least one fluid storage tank. A first controllable valve is located along the first flow path. The fluid dispenser also comprises a fluid inlet for a second fluid located along the first flow path downstream of the first controllable valve. A recirculation pump is coupled to the second flow path. The control system is adapted to cause the first fluid to be evacuated from the first and second conduits when the fluid dispenser is not in use.

According to another aspect, the present invention provides a method of measuring the flow rate of a fluid in a fluid dispenser for dispensing fluid to a vehicle in a fueling environment. The method comprises providing a fluid dispenser defining a fluid conduit connectable to a fluid flow path between at least one fluid storage tank and a nozzle coupled to the fluid dispenser and providing a fluid flow meter located along the fluid flow path. The method also comprises measuring the temperature of the fluid and comparing the temperature of the fluid to a predetermined temperature. If the temperature of the fluid differs from the predetermined temperature, the temperature of the fluid is conditioned upstream of the fluid flow meter.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
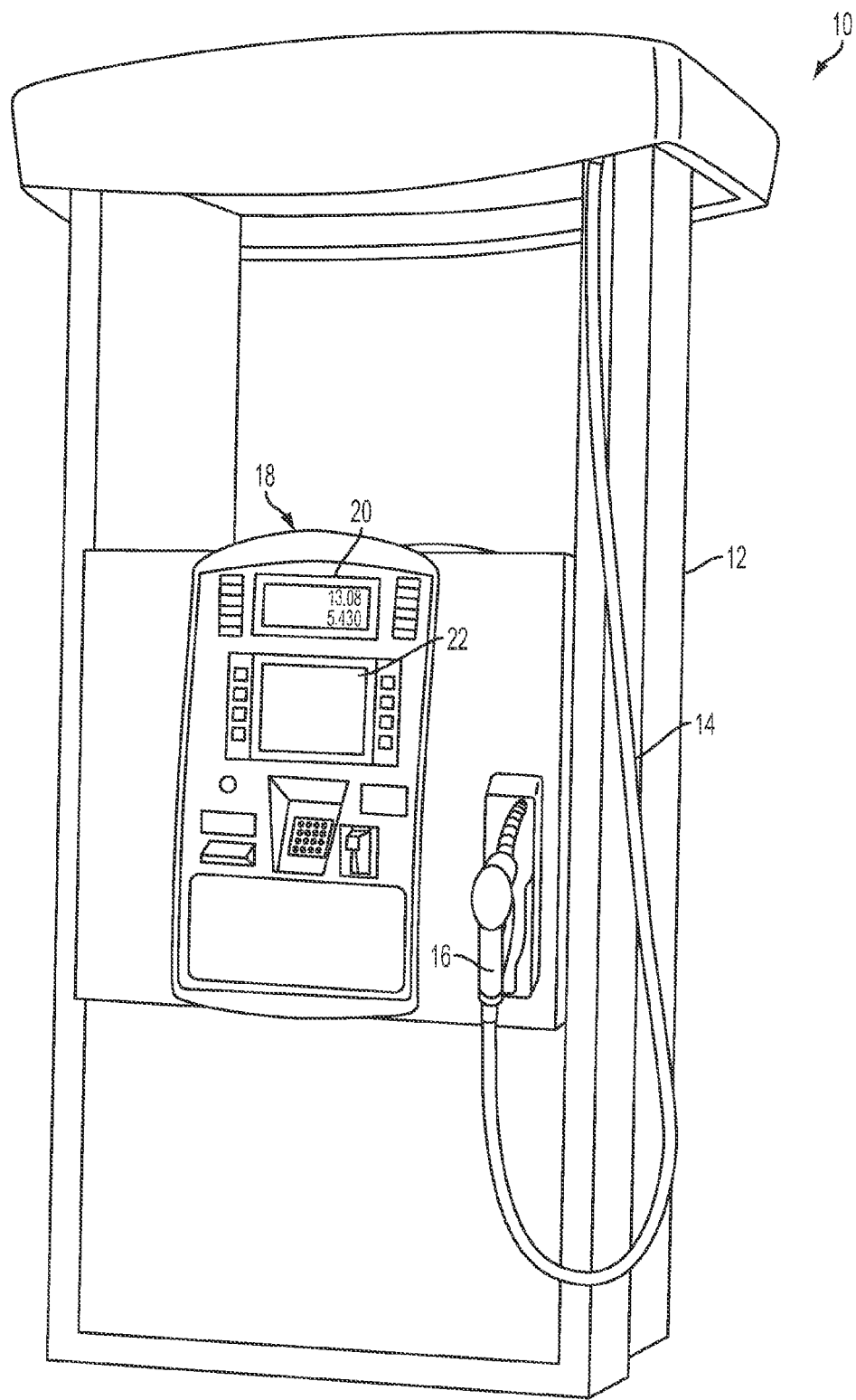
FIG. 1 is perspective view of a prior art fuel dispenser for use in a retail service station environment.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention provides a system for temperature conditioning and control of fluids in fluid dispensers. Embodiments of the present invention may be particularly adapted for use in dispensing DEF and liquid fuels, such as gasoline or diesel fuel. The terms diesel exhaust fluid and DEF are used broadly herein to refer to any reductant used to reduce nitrogen oxide emissions in vehicles, including ammonia and urea. To facilitate explanation of the preferred embodiments, a description of exemplary prior art fluid dispensing systems is first provided below.

FIG. 1 is perspective view of a prior art fuel dispenser 10 adapted for use in a retail service station environment. For example, fuel dispenser 10 may be the ENCORE® S fuel dispenser sold by Gilbarco Inc. of Greensboro, N.C.

Fuel dispenser 10 includes a housing 12 with a flexible fuel hose 14 extending therefrom. Fuel hose 14 terminates in a manually-operated nozzle 16 adapted to be inserted into a fill neck of a vehicle's fuel tank. Nozzle 16 includes a fuel valve. Various fuel handling components, such as valves and meters, are also located inside of housing 12. These fuel handling components allow fuel to be received from underground piping and delivered through hose 14 and nozzle 16 to a vehicle's tank, as is well understood.

The fuel dispenser 10 has a customer interface 18. Customer interface 18 may include an information display 20 relating to an ongoing fueling transaction that includes the amount of fuel dispensed and the price of the dispensed fuel. Further, customer interface 18 may include a media display 22 to provide advertising, merchandising, and multimedia presentations to a customer in addition to basic transaction functions. The graphical user interface provided by the dispenser allows customers to purchase goods and services other than fuel at the dispenser.

Figure 2:
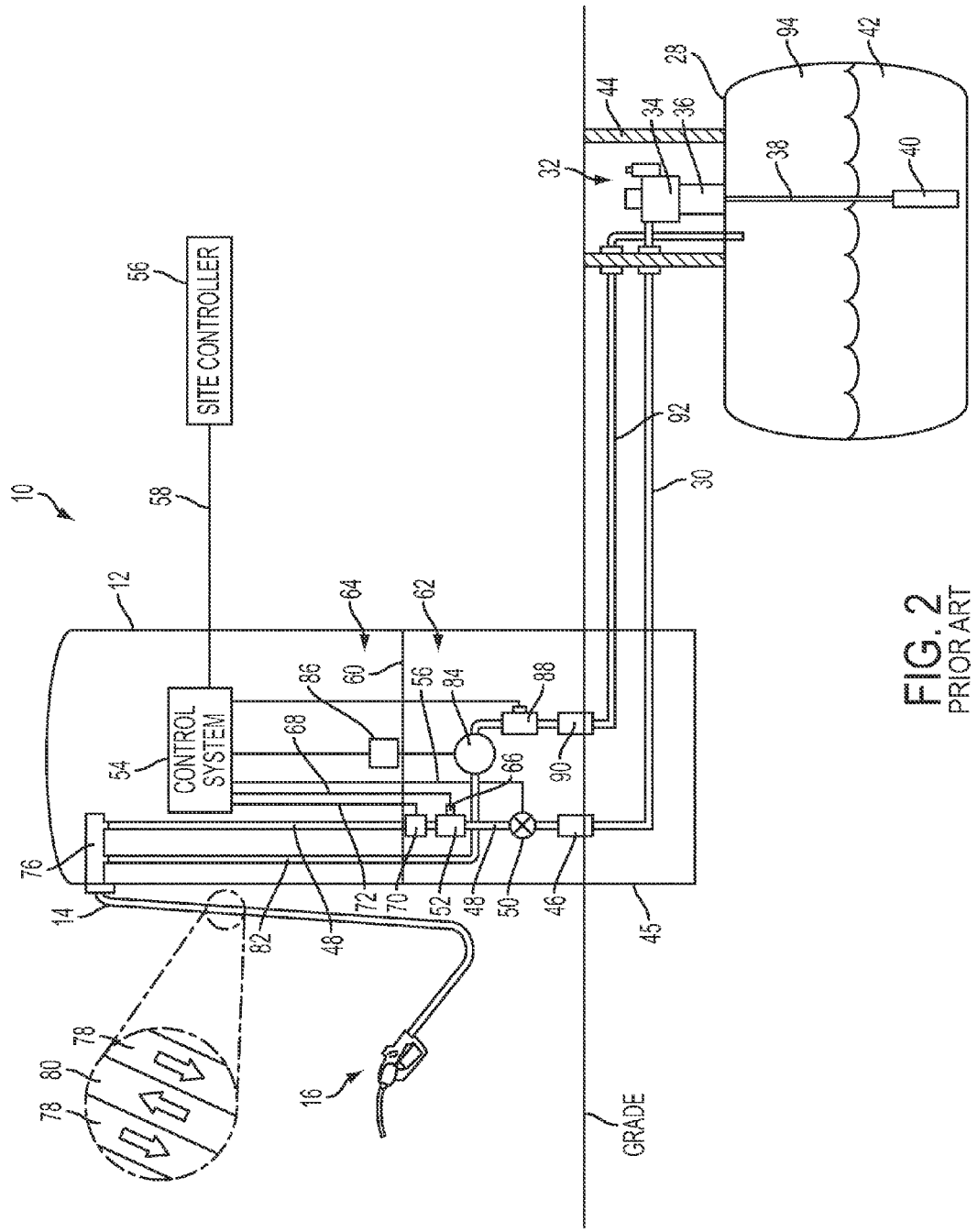
FIG. 2 is a schematic illustration of a prior art fuel dispensing system including the dispenser of FIG. 1.

FIG. 2 provides a schematic illustration of a prior art fuel dispensing system in a retail service station environment. In general, fuel may travel from an underground storage tank (UST) 28 via main fuel piping 30, which may be a double-walled pipe having secondary containment as is well known, to fuel dispenser 10 and nozzle 16 for delivery. An exemplary underground fuel delivery system is illustrated in U.S. Pat. No. 6,435,204 to White et al., hereby incorporated by reference in its entirety for all purposes.

More specifically, a submersible turbine pump (STP) 32 associated with the UST 28 is used to pump fuel to the fuel dispenser 10. However, some fuel dispensers may be self-contained, meaning fuel is drawn to the fuel dispenser 10 by a pump controlled by a motor positioned within housing 12.

STP 32 is comprised of a distribution head 34 containing power and control electronics that provide power through a riser pipe 36 down to a boom 38 inside the UST 28, eventually reaching a turbine pump contained inside an outer turbine pump housing 40. STP 32 may preferably be the RED JACKET® submersible turbine pump, manufactured by the Veeder-Root Co. of Simsbury, Conn. Also, STP 32 may contain a siphon that allows the STP 32 to generate a vacuum using the force of fuel flow. In addition, riser pipe 36 and distribution head 34 may preferably be secondarily contained to capture and monitor leaks. For example, such a system is disclosed in U.S. Pat. No. 7,010,961 to Hutchinson et al., hereby incorporated by reference in its entirety for all purposes. There may be a plurality of USTs 28 and STPs 32 in a service station environment if more than one type or grade of fuel 42 is to be delivered by a fuel dispenser 10.

The turbine pump operates to draw fuel 42 upward from the UST 28 into the boom 38 and riser pipe 36 for delivery to the fuel dispenser 10. After STP 32 draws the fuel 42 into the distribution head 34, the fuel 42 is carried through STP sump 44 to main fuel piping 30. Main fuel piping 30 carries fuel 42 through dispenser sump 45 to the fuel dispenser 10 for eventual delivery. Those of skill in the art will appreciate that dispenser sump 45, which may also be double-walled, is adapted to capture any leaked fuel 42 that drains from fuel dispenser 10 and its fuel handling components so that fuel 42 is not leaked into the ground.

Main fuel piping 30 may then pass into housing 12 through a product line shear valve 46. As is well known, the product line shear valve 46 is designed to close the fuel flow path in the event of an impact to fuel dispenser 10. U.S. Patent App. Pub. No. 2006/0260680 to Reid et al., hereby incorporated by reference in its entirety for all purposes, discloses an exemplary secondarily-contained shear valve adapted for use in service station environments. The product line shear valve 46 contains an internal fuel flow path to carry the fuel 42 from the main fuel piping 30 to internal fuel piping 48, which may also be double-walled.

After the fuel 42 exits the outlet of the shear valve 46 and enters into the internal fuel piping 48, it may encounter a flow control valve 50 positioned upstream of a flow meter 52. In some prior art fuel dispensers, the valve 50 may be positioned downstream of the flow meter 52. The valve 50 may preferably be a proportional solenoid controlled valve, such as described in U.S. Pat. No. 5,954,080 to Leatherman, hereby incorporated by reference in its entirety.

The flow control valve 50 is under control of a control system 54 via a flow control valve signal line 56. In this manner, the control system 54 can control the opening and closing of the flow control valve 50 to either allow fuel to flow or not flow through meter 52 and on to the hose 14 and nozzle 16. Control system 54 may be a microprocessor, microcontroller, or other electronics with associated memory and software programs running thereon. Control system 54 typically controls other aspects of the fuel dispenser 10, such as valves, displays, and the like as is well understood. For example, the control system 54 typically instructs the flow control valve 50 to open when a fueling transaction is authorized. In addition, control system 54 may be in electronic communication with a site controller 56 via a fuel dispenser communication network 58. The site controller 56 communicates with control system 54 to control authorization of fueling transactions and other conventional activities. The site controller functions may preferably be provided by the PASSPORT® point-of-sale system manufactured by Gilbarco Inc.

The flow control valve 50 is contained below a vapor barrier 60 in a hydraulics compartment 62 of the fuel dispenser 10. The control system 54 is typically located in an electronics compartment 64 of the fuel dispenser 10 above vapor barrier 60. After the fuel 42 exits the flow control valve 50, it typically flows through meter 52, which measures the volume and/or flow rate of the fuel.

Flow meter 52 is typically a positive displacement or inferential flow meter. Meter 52 typically comprises a pulser 66 that generates a pulse series indicative of the volumetric flow rate of fuel and periodically transmits the pulse series to control system 54 via a pulser signal line 68. In this manner, the control system 54 can update the total gallons dispensed and the price of the fuel dispensed on the information display 20.

As fuel leaves the flow meter 52 it enters a flow switch 70. The flow switch 70, which is preferably a one-way check valve that prevents rearward flow through fuel dispenser 10, generates a flow switch communication signal via the flow switch signal line 72 to the control system 54 to communicate when fuel is flowing through the flow meter 52. The flow switch communication signal indicates to control system 54 that fuel is actually flowing in the fuel delivery path and that subsequent signals from flow meter 52 are due to actual fuel flow.

After the fuel 42 enters flow switch 70, it exits through internal fuel piping 48 to be delivered to a blend manifold 76. Blend manifold 76 receives fuels of varying octane levels from the various USTs and ensures that fuel of the octane level selected by the customer is delivered. After flowing through blend manifold 76, the fuel passes through fuel hose 14 and nozzle 16 for delivery to the customer's vehicle.

In this case, fuel dispenser 10 comprises a vapor recovery system to recover fuel vapors through nozzle 16 and hose 14 to return to UST 28. An example of a vapor recovery assist equipped fuel dispenser is disclosed in U.S. Pat. No. 5,040,577 to Pope, incorporated herein in its entirety for all purposes. More particularly, flexible fuel hose 14 is coaxial and includes a product delivery line 78 and a vapor return line 80. Both lines 78 and 80 are fluidly connected to UST 28 through fuel dispenser 10. Lines 78 and 80 diverge internal to dispenser 10 at manifold 76, such that product delivery line 78 is fluidly coupled to internal fuel piping 48 and vapor return line 80 is fluidly coupled to internal vapor return piping 82. During delivery of fuel into a vehicle's fuel tank, the incoming fuel displaces air in the fuel tank containing fuel vapors. Vapor may be recovered from the vehicle's fuel tank through vapor return line 80 and returned to the UST 28 with the assistance of a vapor pump 84. A motor 86 operates vapor pump 84. Internal vapor return piping 82 is coupled to a vapor flow meter 88. Vapor flow meter 88, which measures vapor collected by the nozzle 16 when fuel 42 is dispensed, may be used for in-station diagnostics and monitoring or control of vapor recovery as is well known.

After the recovered vapor passes through the vapor flow meter 88, the recovered vapor passes to vapor line shear valve 90 (which is analogous to product line shear valve 46). Finally, the recovered vapor returns to UST 28 via vapor return piping 92. Vapor return piping 92 is fluidly coupled to the ullage 94 of UST 28. Thus, the recovered vapor is recombined with the vapor in the ullage 94 to prevent vapor emissions from escaping to the atmosphere. The vapors recombine and liquefy into fuel 42.

Figure 3:
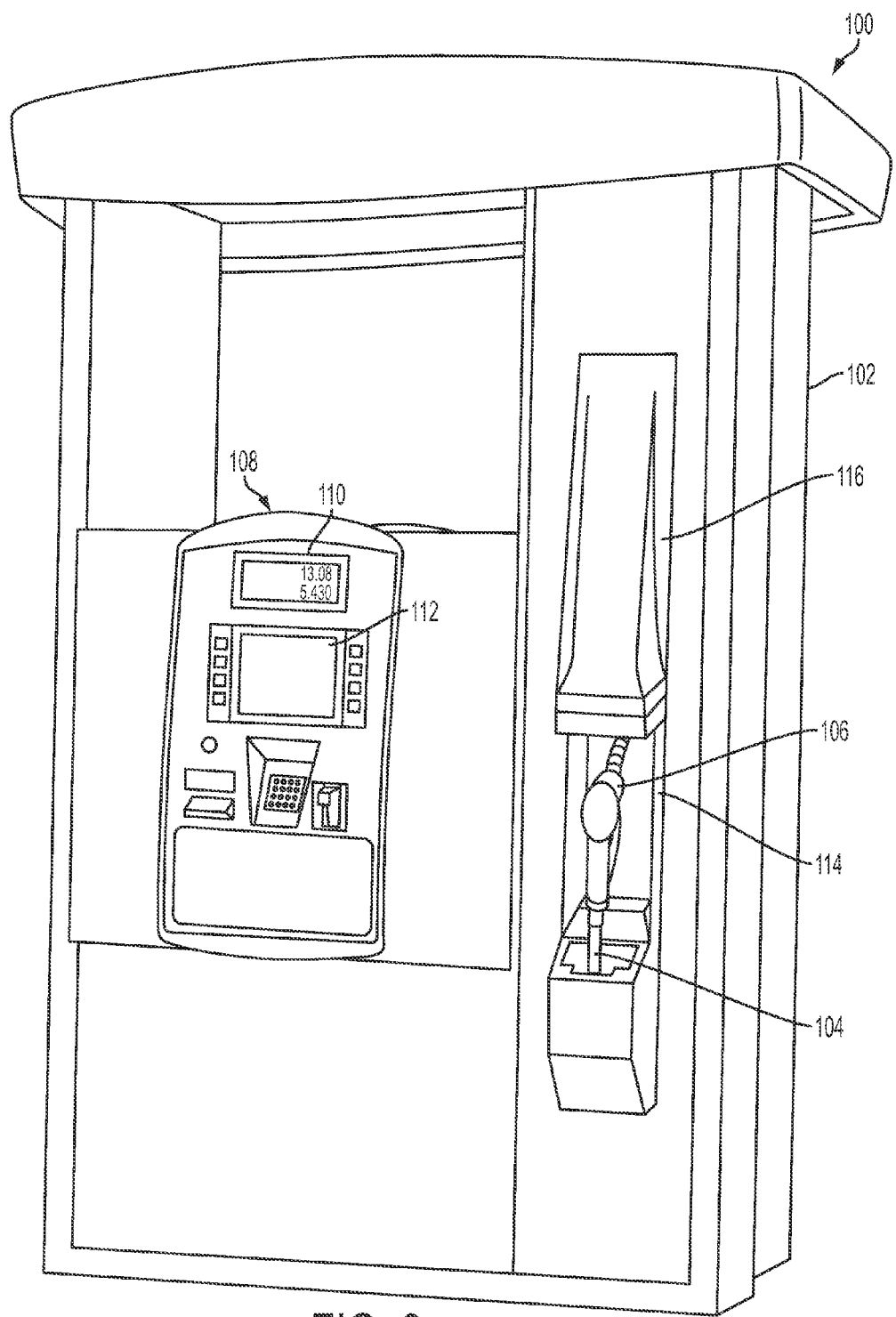
FIG. 3 is a perspective view of a prior art DEF dispenser for use in a retail service station environment.

FIG. 3 is a perspective view of a prior art DEF dispenser 100 for use in a retail service station environment. For example, dispenser 100 may be the ENCORE® S DEF dispenser, sold by Gilbarco Inc. DEF dispenser 100 is in many respects similar to fuel dispenser 10 and comprises a housing 102 containing fluid handling components. These fluid handling components allow DEF to be received from above- or below-ground piping and delivered through hose 104 and nozzle 106 to a vehicle's DEF tank, as is well understood. In addition, DEF dispenser 100 comprises a customer interface 108, information display 110, and media display 112 analogous to those described above.

However, DEF is corrosive to some materials, such as aluminum and carbon steel, and the purity of DEF must be maintained as it is dispensed. Thus, many DEF dispenser fluid handling components are plated or formed of stainless steel or composite plastic. One example of a hose 104 and a nozzle 106 that may be utilized for dispensing DEF is the 21Gu™ DEF filling system, sold by OPW of Hamilton, Ohio.

As explained above, DEF is known to have a relatively high freezing temperature. Thus, fuel hose 104 is an automatically retractable hose that is stored in a compartment of DEF dispenser 100 when not in use. Further, nozzle 106 is stowed in an insulated and/or heated nozzle boot 114 that is enclosed by a slidable access door 116. When DEF dispensing is desired, a customer may slide the access door 116 upward so that nozzle 106 and hose 104 may be extracted. Other prior art DEF dispensers may employ "hanging" hoses and nozzles that are insulated to prevent DEF that resides in the system while not in use from freezing.

Those of skill in the art will appreciate that the fluid handling components of a prior art DEF dispensing system are in many respects analogous to those of the prior art fuel dispensing system illustrated in FIG. 2. By way of additional background, however, a brief discussion of some notable differences between the two systems follows.

First, although DEF may be provided to DEF dispenser 100 from a UST, it may also be delivered from an above-ground tank, such as an intermediate bulk carrier (IBC) or a larger "skid tank." In such a case, DEF may be delivered to the dispenser 100 via above-ground piping, which may be insulated and/or heated. Both wet-pit (i.e., submersible) and dry-pit pumps may be used to deliver DEF from the tank DEF dispenser 100.

Embodiments of the present invention provide a system to condition fluid, including both liquid fuel and DEF, to be dispensed to a desired temperature and maintain this temperature even while dispensing is not ongoing. Thereby, a fluid dispenser may both obtain an accurate measurement of the volume of fluid dispensed and avoid inoperability and/or component damage at low temperatures. Moreover, the system may be used to sell fluid at a specific temperature as compensated wholesale sales.

In preferred embodiments described in more detail below, the system comprises two subsystems. First, the system preferably comprises a temperature conditioning subsystem inline to the fluid flow path at a location upstream of a flow meter. This subsystem may comprise either or both of a heating device and a cooling device. Second, the system preferably comprises a recirculation subsystem to recirculate the fluid through the dispenser and/or back to a storage tank. The recirculation may be continuous or intermittent, and in some embodiments the internal dispenser piping may be evacuated to prevent freezing. However, depending on the climate at the location of the fluid dispenser, the type of fluid dispensed, and the needs of an operator, the recirculation subsystem may not be provided. For example, where the cooling device is needed to lower the temperature of the fluid dispensed, the fluid dispenser may not include a recirculation subsystem. This could be the case in some warmer climates where liquid fuel is dispensed.

Figure 4:
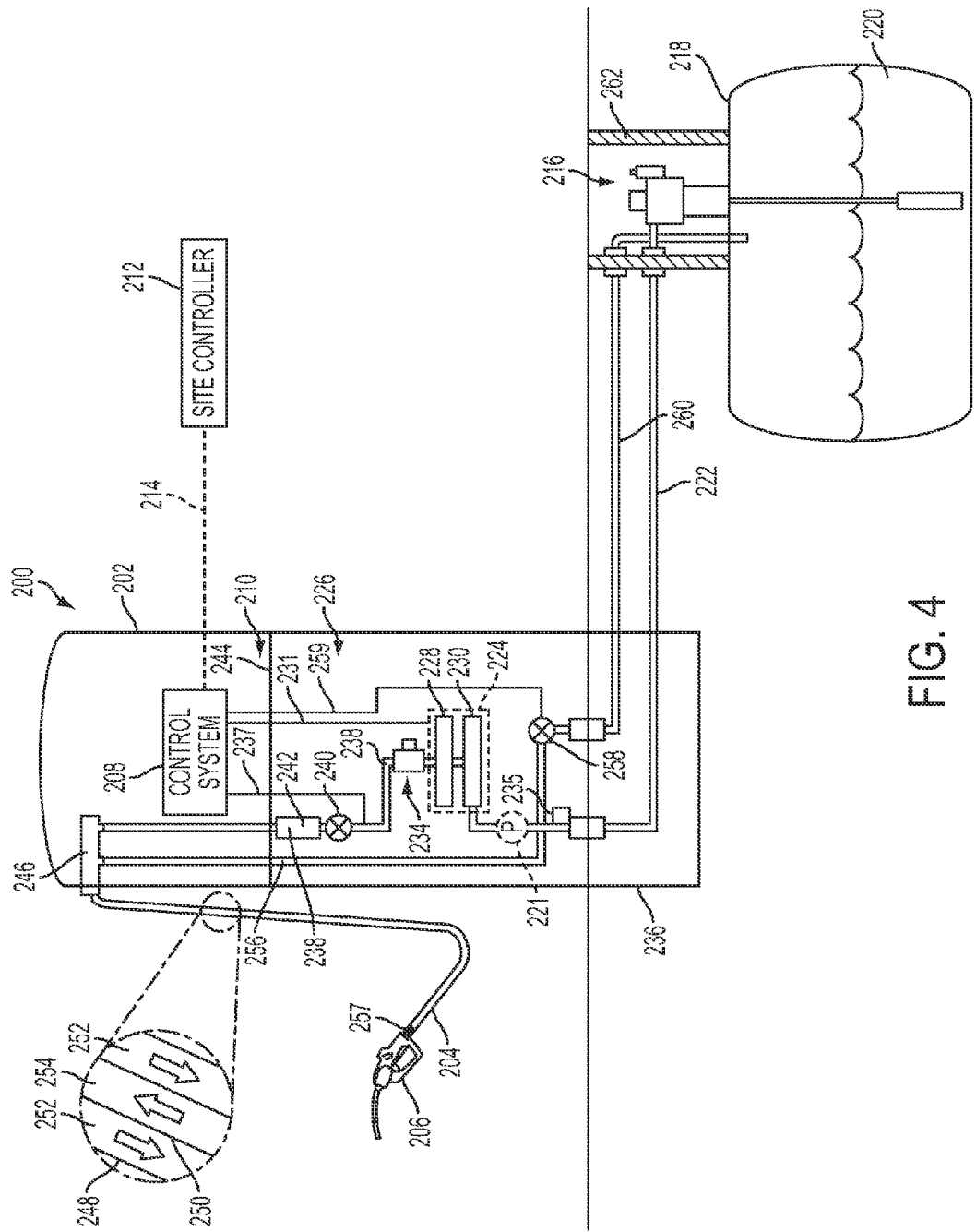
FIG. 4 is a schematic illustration of a fluid temperature conditioning and control system according to one embodiment of the present invention.

More specifically, FIG. 4 shows a fluid temperature conditioning and control system in accordance with one embodiment of the present invention. Fluid dispenser 200 is preferably adapted to dispense either liquid fuel or DEF and comprises a housing 202 with a coaxial fluid hose 204 extending therefrom. Hose 204 terminates in a manually-operated nozzle 206 adapted to be inserted into a vehicle's fuel or DEF tank. As explained above, those of skill in the art will appreciate that the materials used in constructing the fluid handling components (including hose 204 and nozzle 206) of dispenser 200 may depend on whether liquid fuel or DEF will be dispensed.

Fluid dispenser 200 comprises a control system 208 which is preferably positioned in an electronics compartment 210. As described in more detail below, in this embodiment control system 208 controls the fluid temperature conditioning aspects of the present invention. Control system 208 preferably also controls various other functions of fluid dispenser 200, such as valves, displays and the like, as is well understood. Control system 208 may preferably be communicatively coupled to a site controller 212, for example by a suitable dispenser communication network 214.

Generally, an STP 216, which is preferably analogous to STP 32, is associated with a UST 218 containing fluid 220 to pump fluid 220 along a fluid flow path to fluid dispenser 200 for eventual delivery. However, as explained above, in alternative embodiments an above-ground storage tank may be provided and/or a dry-pit pump may be used to pump fluid 220 to the fluid dispenser 200. In addition, fluid 220 may preferably be either liquid fuel or DEF. Additionally, in some embodiments fluid dispenser 200 may be self-contained, meaning fluid 220 is drawn to the fluid dispenser 200 by a pump 221 controlled by a motor positioned within housing 202. Those of skill in the art will appreciate that where STP 216 is used to pump fluid 220, pump 221 may not be provided.

Fluid 220 flowing through main fluid piping 222 enters housing 202 and first encounters a fluid temperature conditioning subsystem 224. In some embodiments, main fluid piping 222 may be double-walled and may be above- or below-ground. Also, those of skill in the art will appreciate that where main fluid piping 222 is provided below-ground, main fluid piping 222 and any associated valves or manifolds are typically buried below the "frost line." Further, in some embodiments, main fluid piping 222 may first enter housing 202 via a shear valve analogous to shear valve 46. Temperature conditioning subsystem 224, which in this case is positioned in a fluid handling compartment 226 of fluid dispenser 200, is adapted to condition the fluid to maintain it at a desired temperature. In preferred embodiments, temperature conditioning subsystem 224 may comprise a heating device 228 and/or a cooling device 230, each in electronic communication with control system 208. This may be accomplished via communication line 231.

As explained above, fluid temperature conditioning subsystem 224 may perform several functions. For example, it may condition liquid fuel or DEF to a predetermined temperature upstream of a flow meter 234 to facilitate accurate volumetric measurement. Also, it may condition DEF to prevent the DEF from crystallizing and freezing at low temperatures.

Although fluid temperature conditioning subsystem 224 is illustrated in FIG. 4 internal to fluid handling compartment 226, those of skill in the art will appreciate that fluid temperature conditioning subsystem 224 may be located at any location along the path of fluid flow between UST 218 and nozzle 206. In some embodiments, for example, temperature conditioning subsystem 224 may be located in UST 218 and provide temperature conditioning functionality for a plurality of fluid dispensers 200 located at a retail service station. However, temperature conditioning subsystem 224 is preferably located immediately upstream of flow meter 234 so that meter 234 may measure the fluid 220 at a constant temperature and volume.

Heating device 228 is preferably an electrical, on-demand heater situated in-line to the fluid flow path. A suitable heating device is selected based on various factors, such as the type of fluid dispensed, the location of the heating device along the fluid flow path, and the ambient temperatures to which the fluid dispenser is exposed, among other factors. Many different types of devices may be used for heating device 228, including tubular, immersion, circulation, and impedance heaters.

However, in preferred embodiments, heating device 228 may be an induction heater. Induction heaters have several desirable characteristics. For example, induction heaters provide for precise temperature control and rapid adjustment of temperature. In addition, heat is provided uniformly along the length of the pipe being heated. Induction heaters may be used to heat a conductive pipe by subjecting the pipe to a time-varying magnetic field which surrounds a coil carrying high frequency alternating current. Heating of the pipe occurs via the electrical resistance of the pipe and, where the pipe is formed of a magnetic material, hysteresis losses.

Several induction heating arrangements are possible. The coil is typically provided having one or more windings surrounding the section of the pipe to be heated. Often, the coil is formed of copper tubing and may be cooled by circulating water therethrough. In this arrangement, the pipe is heated via resistance and hysteresis losses and heat is conducted to the fluid flowing in the pipe. However, in alternative embodiments, a magnetic wire may be provided internal to a non-conductive conduit or hose in the fluid flow path. The coil again has one or more windings surrounding the section of the conduit to be heated. In this case, however, the conduit itself is not heated. Instead, the wire generates heat via electrical resistance and hysteresis losses and heat is conducted to the fluid in the conduit.

Cooling device 230 is also situated in-line to the fluid flow path. Cooling device 230 preferably comprises a suitable on-demand refrigeration system. For example, cooling device 230 may comprise a closed-circuit vapor-compression refrigeration system. Alternatively, a heat exchanger suitable for cooling fluid flowing in a pipe may be used, such as a shell and tube or plate and fin heat exchanger.

Depending on the fluid dispensed and the environment in which fluid dispenser 200 operates, those of skill in the art will appreciate that either heating device 228 or cooling device 230 may not be provided in temperature conditioning subsystem 224. For example, cooling device 230 is not typically provided if fluid dispenser 200 dispenses DEF. Further, where both devices are provided, heating device 228 and cooling device 230 may be arranged in the fluid flow path in any order.

Control system 208 is adapted to selectively operate temperature conditioning subsystem 224 based on the temperature of fluid 220 and the ambient temperature. (Typically, both devices 228, 230 will not be operating simultaneously.) Thus, control system 208 is preferably in electronic communication with one or more thermometric probe located at various locations along the fluid flow path and associated with fluid dispenser 200, such as thermometric probe 235. Although not shown in FIG. 4, those of skill in the art will appreciate that the one or more thermometric probes may communicate with control system 208 via suitable communication lines. Thermometric probes may preferably be provided at least in the UST 218, dispenser sump 236, and flow meter 234. Control system 208 receives temperature information from the thermometric probes and determines whether the temperature of the fluid needs to be conditioned. For example, when the ambient temperature falls below a predetermined level, control system 208 may determine that fluid 220 should be heated to prevent freezing. Alternatively, when temperatures are at a suitable level, temperature conditioning subsystem 224 is not operated and fluid 220 will simply flow through subsystem 224 without being conditioned.

In many embodiments, fluid leaving temperature conditioning subsystem 224 next encounters flow meter 234. Flow meter 234 may be any suitable flow meter for fluid dispensing, but meter 234 may preferably be a positive displacement or inferential flow meter. Other types of flow meters are contemplated, however, including Coriolis mass flow meters. Meter 234 is preferably analogous to meter 52, and thus it may comprise a pulser in electronic communication with control system 208.

After the fluid 220 exits the outlet of flow meter 234, it flows through internal fluid piping 238 to a flow control valve 240 and a flow switch 242. Flow control valve 240 may be a proportional solenoid valve analogous to flow control valve 50 and may preferably be located below a vapor barrier 244. In some embodiments, flow control valve 240 may be located upstream of flow meter 234. Flow switch 242, which is preferably analogous to flow switch 70, is preferably a one-way check valve that prevents rearward flow through fluid dispenser 200. As with flow control valve 50 and flow switch 70 above, flow control valve 240 and flow switch 242 are in electronic communication with control system 208 to allow fluid dispensing and communicate when fluid is flowing through flow meter 234.

Fluid 220 exiting flow switch 242 is carried via internal fluid piping 238 to a flow manifold 246. Manifold 246 is fluidly coupled to internal fluid piping 238 and fluid dispensing hose 204 to direct fluid 220 from flow switch 242 to hose 204. In many embodiments, fluid dispenser 200 is not adapted for vapor recovery. Nevertheless, hose 204 may preferably comprise concentric outer hose 248 and inner hose 250, which define a fluid delivery line 252 and a fluid return line 254. As explained in more detail below, coaxial fluid hose 204 facilitates recirculation of fluid, such as when fluid dispenser 200 is not in use. Those of skill in the art will appreciate that where it is desirable that fluid dispenser 200 be adapted for vapor recovery, for example where fluid 200 is liquid fuel, a three-channel hose may be provided.

Internal fluid piping 238 is fluidly coupled to fluid delivery line 252 at manifold 246. Thus, after flowing through manifold 246, fluid 220 passes through fluid delivery line 252 of fluid hose 204 to nozzle 206 for delivery to a customer's vehicle. To initiate fluid flow, the customer manually activates a trigger on fluid nozzle 206 which opens a dispensing valve in nozzle 206 so that fluid is dispensed into the vehicle. Manifold 246 also provides a fluid coupling between fluid return line 254 and internal fluid return piping 256, which may be double-walled. As explained in more detail below, this coupling facilitates recirculation of fluid 220 through dispenser 200 or return of fluid 220 to UST 218.

In this regard, in one embodiment of the present invention, a recirculation subsystem may cooperate with fluid temperature conditioning subsystem 224 to condition the fluid 220. Specifically, the recirculation subsystem comprises a one-way bypass valve 257 situated at the distal end of fluid return line 254 of fluid hose 204, which is connected to nozzle 206. The bypass valve 257, which may be a spring loaded poppet valve, is biased to close fluid return line 254 during fluid dispensing, when the fluid pressure in nozzle 206 and fluid hose 204 is relatively low.

The recirculation subsystem also comprises a second bypass valve 258 located downstream of manifold 246 in the fluid return path along internal fluid return piping 256. Second bypass valve 258 may preferably be a solenoid-controlled valve in electronic communication with control system 208 via communication line 259. In this embodiment, valve 258 is located in fluid handling compartment 226, but those of skill in the art will appreciate that it may be located at any point downstream of manifold 246 along the fluid return path to UST 218. Second bypass valve 258 is normally in the closed position when the recirculation subsystem is not in use.

Finally, the recirculation subsystem comprises main fluid return piping 260, which may be double-walled. In some embodiments, main fluid return piping 260 may be fluidly coupled to internal fluid return piping 256 via a shear valve, as described above. Main fluid return piping 260 is in fluid communication with UST 218, extending from housing 202 through dispenser sump 236 and STP sump 262. Thus, as described below, in this embodiment fluid 220 may be continuously recirculated back to UST 218 to maintain the temperature of fluid 220 when not being dispensed.

In operation, once dispensing is complete, the customer manually releases the trigger on nozzle 206 and its internal dispensing valve closes. Normally, at this point control system 208 closes flow control valve 240 to stop the flow of fluid to nozzle 206. However, if control system 208 determines that the temperature of the fluid 220 and/or the ambient temperature is below a predetermined level, it will activate the recirculation subsystem of the present invention. Specifically, in this embodiment, control system 208 allows the flow control valve 240 to remain open, causing fluid pressure to build in nozzle 206 and fluid supply line 252. As a result, the one-way valve 257 in fluid return line 254 opens and fluid 220 will enter fluid return line 254.

Control system 208 also causes second bypass valve 258 to open, and fluid 220 flows from fluid return line 254 through manifold 246, internal fluid return piping 256, and main fluid return piping 260. Finally, fluid 220 is returned to UST 218. Therefore, the recirculation subsystem will maintain the temperature of the fluid 220 and may improve the flexibility of hose 204 at low temperatures. Those of skill in the art will appreciate that continuous recirculation of fluid 220 may be sufficient to prevent freezing of fluid 220, in which case temperature conditioning subsystem 224 would not be operated. However, in colder climates it is contemplated that temperature conditioning subsystem 224 may operate in conjunction with the recirculation subsystem. Control system 208 will continue to operate the recirculation subsystem until dispensing is resumed or it determines that the fluid and/or ambient temperatures have risen to an acceptable level. When either event occurs, control system 208 will cause flow control valve 240 and second bypass valve 258 to close.

Figure 5:
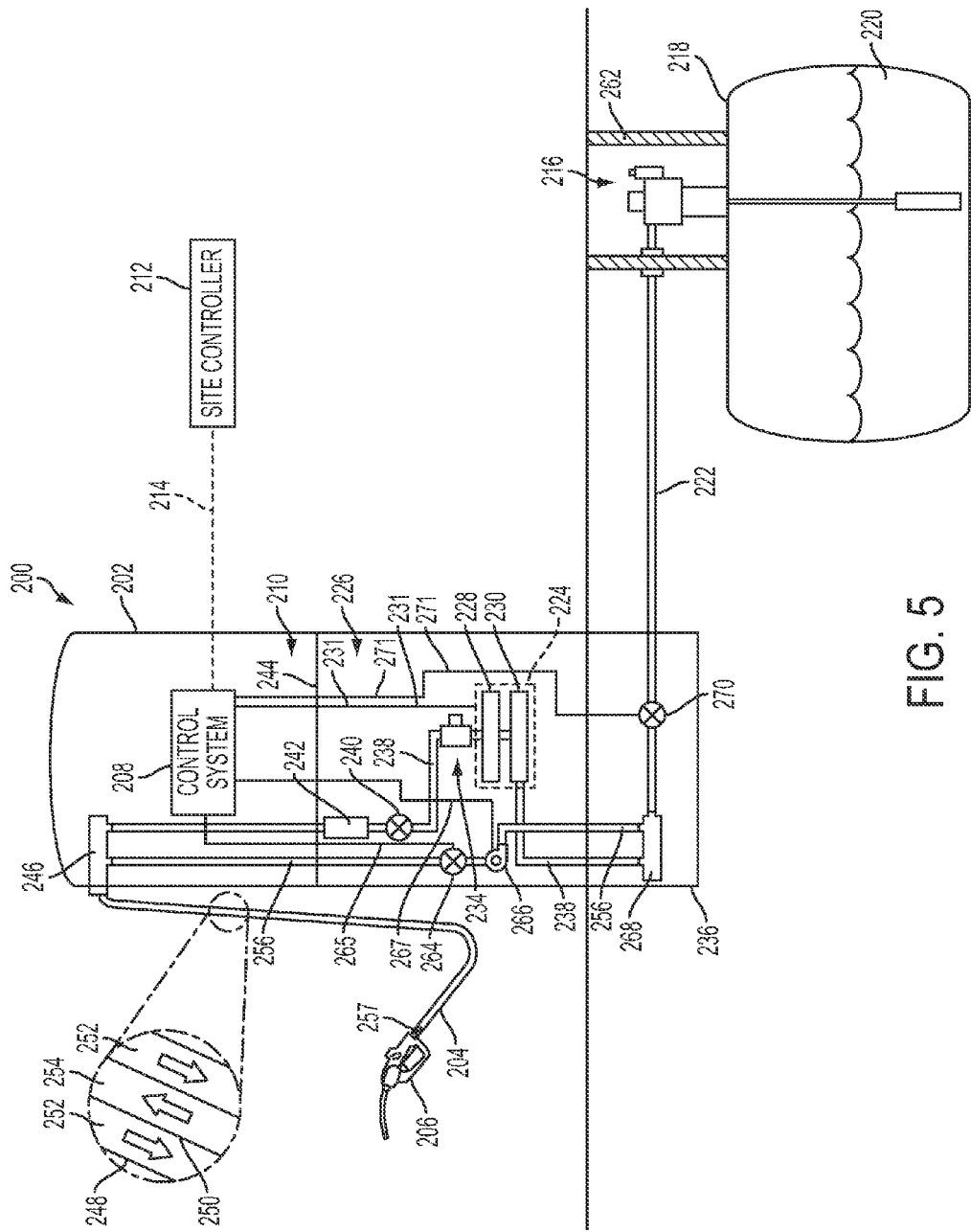
FIG. 5 is a schematic illustration of a fluid temperature conditioning and control system according to an alternative embodiment of the present invention.

FIG. 5 provides a schematic illustration of a fluid temperature conditioning and control system according to an alternative embodiment of the present invention. The fluid dispensing system illustrated in FIG. 5 is in many respects identical to the fluid dispensing system illustrated in FIG. 4. However, in this embodiment, once fluid dispensing is complete, fluid 220 recirculates through fluid dispenser 200 instead of returning to UST 218.

In particular, the recirculation subsystem illustrated in FIG. 5 comprises the bypass valve 257 in fluid return line 254 described above and a second bypass valve 264, which is preferably analogous to valve 258. Thus, valve 264 is in electronic communication with control system 208 via communication line 265. However, valve 264 may be located upstream of a fluid recirculation pump 266. Valve 264 is normally in the closed position when the recirculation subsystem is not in operation. Recirculation pump 266 is in electronic communication with control system 208 via communication line 267. In some embodiments, pump 266 may comprise a controlled valve, in which case second bypass valve 264 may be unnecessary.

In the recirculation subsystem of this embodiment, main fluid piping 222 extends from STP 216 through STP sump 262 and dispenser sump 236 to a recirculation manifold 268. In addition, main fluid piping 222 includes a stop valve 270. A junction (i.e., recirculation manifold 268) fluidly couples main fluid piping 222 to internal fluid piping 238 and internal fluid return piping 256. Stop valve 270 is in electronic communication with control system 208 via communication line 271 and may preferably be a solenoid controlled valve. As described below, stop valve 270 is normally in the open position.

In operation, once dispensing is complete and control system 208 determines that temperatures are below a predetermined level, it will activate the recirculation subsystem. Control system 208 again allows flow control valve 240 to remain open so that fluid 220 will enter fluid return line 254. Control system 208 causes second bypass valve 264 to open and stop valve 270 to close, thus trapping fluid 220 in a recirculation loop. Control system 208 also activates recirculation pump 266 to cause fluid 220 to recirculate through fluid dispenser 200. Temperature conditioning subsystem 224 typically operates in conjunction with the recirculation subsystem to heat the fluid 220 as it flows along the fluid flow path, as needed.

As explained above, this recirculation will continue until dispensing is commenced or fluid and/or ambient temperatures reach a predetermined threshold. Upon occurrence of either event, control system 208 causes bypass valve 264 to close, deactivates pump 266, and causes stop valve 270 to open. Where the temperatures reach the predetermined threshold but dispensing is not desired, control system 208 may additionally cause flow control valve 240 to close.

Figure 6:
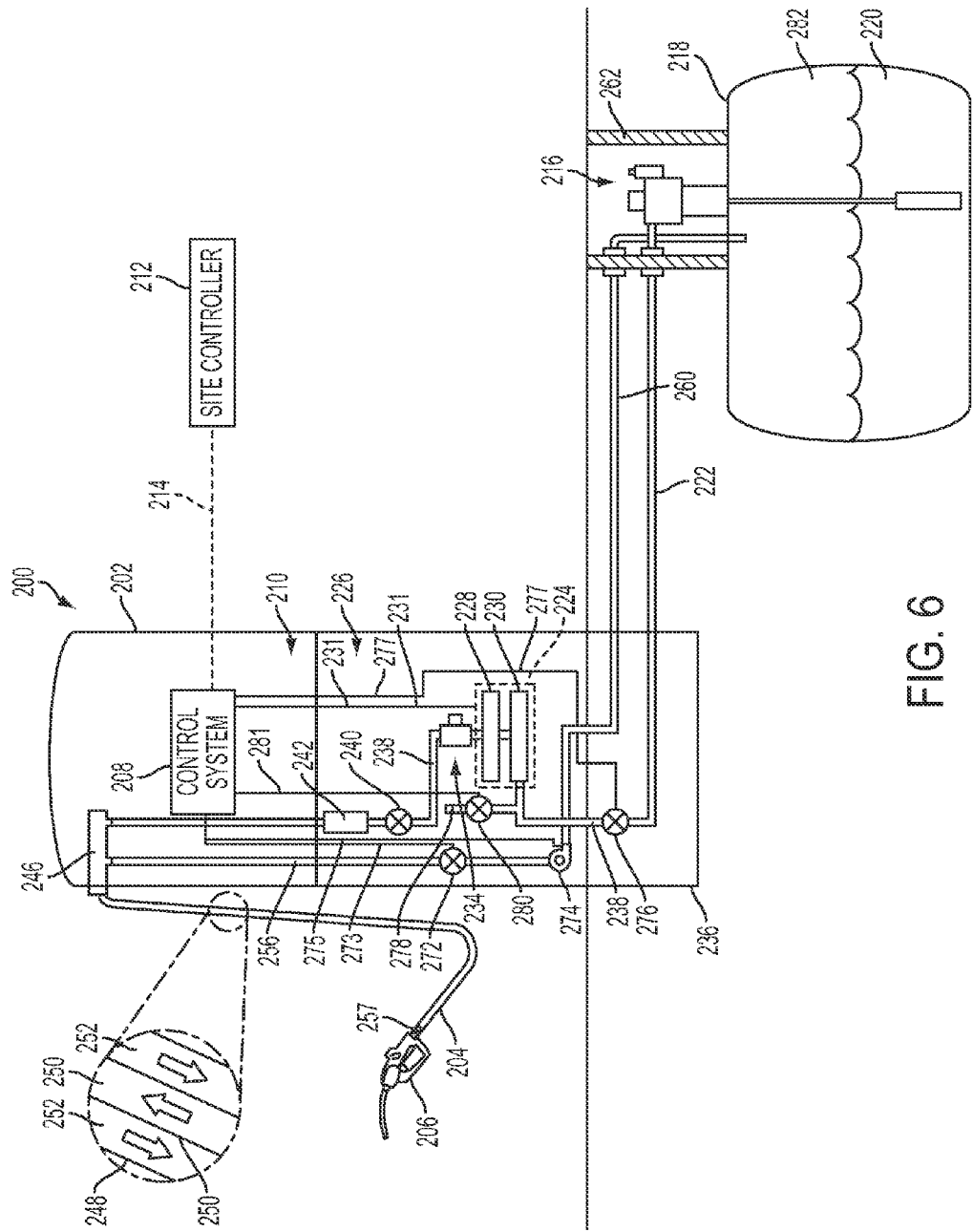
FIG. 6 is a schematic illustration of a fluid temperature conditioning and control system according to a further alternative embodiment of the present invention.

FIG. 6 provides a schematic illustration of a fluid temperature conditioning and control system according to a second alternative embodiment of the present invention. The fluid dispensing system illustrated in FIG. 6 is in many respects identical to the fluid dispensing system illustrated in FIG. 4. However, in this embodiment, once fluid dispensing is complete, fluid 220 is evacuated from fluid dispenser 200 and returned to UST 218. Then, when dispensing is desired, air in the internal fluid piping and fluid handling components of fluid dispenser 200 is removed and the system is primed with fluid.

Those of skill in the art will appreciate that this embodiment may be additionally useful in the event of a protracted loss of power at fluid dispenser 200. Because fluid 220 is returned to UST 218 when the recirculation subsystem of this embodiment is operated, no fluid 220 will remain in the dispenser 200 if power is lost. As a result, the fluid 220 will not freeze inside the dispenser.

In this regard, the recirculation subsystem illustrated in FIG. 6 comprises the bypass valve 257 in fluid return line 254 described above and a second bypass valve 272, which is preferably analogous to valves 258, 264. Valve 272 is in electronic communication with control system 208 via communication line 273. Valve 272, which is also normally closed, may be located upstream of a fluid recirculation pump 274, which is preferably analogous to recirculation pump 266. Pump 274 is in electronic communication with control system 208 via communication line 275. In some embodiments, pump 274 may comprise a controlled valve, in which case second bypass valve 272 may be unnecessary.

In the recirculation subsystem of this embodiment, main fluid piping 222 may extend from STP 216 through STP sump 262 and dispenser sump 236 to an ON/OFF valve 276, which may preferably be a solenoid controlled valve in electronic communication with control system 208 via communication line 277. It will be appreciated that valve 276 need not be located in dispenser sump 236; for example, it may also be located in fluid handling compartment 226. Main fluid piping 222 is in fluid communication with internal fluid piping 238. In this embodiment, internal fluid piping 238 also comprises a fluid inlet 278 and a fluid inlet valve 280. However, those of skill in the art will appreciate that fluid inlet 278 and fluid inlet valve 280 may be located at other locations downstream of valve 276. Valve 280, which is preferably a proportional solenoid controlled valve in electronic communication with control system 208 via communication line 281, is normally in a closed position. As described below, fluid inlet 278 is adapted to introduce a second fluid into internal fluid piping 238 as fluid 220 is evacuated. In the illustrated embodiment the second fluid is air, but those of skill in the art may select other suitable evacuation fluids, such as an inert gas or the like.

In operation, once dispensing is complete and control system 208 determines that the fluid and/or ambient temperatures have fallen below a predetermined threshold, control system 208 activates the recirculation subsystem. Control system 208 again allows flow control valve 240 to remain open so that fluid 220 will enter fluid return line 254. Control system 208 causes ON/OFF valve 276 to close, second bypass valve 272 to open, and fluid inlet valve 280 to open. Control system 208 also activates recirculation pump 274 to evacuate fluid 220 from dispenser 200. Those of skill in the art will appreciate pumping fluid 220 from fluid dispenser 200 while ON/OFF valve 276 is closed creates a pressure in internal fluid piping 238 that is lower than the atmospheric pressure, thus drawing air into the fluid dispenser 200's internal fluid piping and fluid handling components via fluid inlet 278. In this embodiment, temperature conditioning subsystem 224 is not typically operated as fluid 220 is evacuated.

After all of the fluid 220 has been evacuated from fluid dispenser 200 and returned to UST 218, control system 208 deactivates recirculation pump 274. In addition, control system 208 causes fluid inlet valve 280, flow control valve 240, and second bypass valve 272 to close. At this point, no fluid 220 remains in fluid dispenser 200; thus, freezing and associated component damage is not a problem.

When fluid dispensing is desired, a customer removes nozzle 206 from its nozzle boot. Before dispensing may commence, however, fluid dispenser 200 must be primed with fluid 220. Thus, control system 208 causes ON/OFF valve 276, flow control valve 240, and second bypass valve 272 to open. In addition, STP 216 is activated to pump fluid 220 to dispenser 200. (Recirculation pump 274 is not typically operated during priming.) Control system 208 may determine that fluid dispenser 200 is primed, for example, by measuring a predetermined amount of fuel pumped through the system using meter 234, waiting a predetermined amount of time prior to allowing fluid dispensing, or receiving a signal from a pressure transducer. In the latter case, the pressure transducer may preferably be associated with recirculation pump 274, although other locations for the pressure transducer along the fluid flow path are contemplated.

As fluid 220 is reintroduced into fluid dispenser 200, fluid 220 displaces the second fluid (air, in this example) and causes it to flow to ullage 282 of UST 218. To prevent an undesirable rise in pressure in UST 218, an ullage pressure reducing system may be provided. Such systems are well known to those of skill in the art. For example, a vent pipe capped with a pressure relief valve may be fluidly coupled to UST 218 and ullage 282. Thereby, the second fluid that is transferred to ullage 282 may be safely dissipated to the atmosphere. After control system 208 determines that fluid dispenser 200 is primed with fluid 220, control system 208 causes second bypass valve 272 to close. Finally, control system 208 zeroes the display and allows dispensing to commence.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A fluid dispenser for installation in a forecourt in a fueling environment for dispensing liquid from at least one fluid storage tank remote from said fluid dispenser into a vehicle, comprising:
   a housing in which fluid flow control components are located;
   a fluid conduit completing a fluid flow path between said at least one fluid storage tank and a nozzle coupled to said housing;
   a fluid flow meter located along said fluid flow path;
   a control system; and
   a fluid temperature conditioning subsystem positioned in said housing, said fluid temperature conditioning subsystem located along said fluid flow path upstream of said fluid flow meter so as to condition a temperature of said liquid before said liquid is metered, wherein the liquid is diesel exhaust fluid and or liquid fuel.

2. A fluid dispenser as in claim 1, wherein said fluid temperature conditioning subsystem comprises a heating device.

3. A fluid dispenser as in claim 2, wherein said heating device is an induction heater.

4. A fluid dispenser as in claim 1, wherein said fluid temperature conditioning subsystem comprises a cooling device.

5. A fluid dispenser as in claim 1, wherein said control system is adapted to selectively operate said fluid temperature conditioning subsystem upon detection of a predetermined temperature.

6. A fluid dispenser as in claim 5, wherein said control system is in electronic communication with at least one thermometric probe.

7. A fluid dispenser as in claim 1, wherein said fluid dispenser further comprises at least one controllable recirculation valve, said control system being adapted to selectively actuate said at least one controllable recirculation valve such that said liquid flows back to said at least one fluid storage tank.

8. A fluid dispenser as in claim 1, further comprising a recirculation pump coupled to said fluid flow path.

9. A fluid dispenser as in claim 8, wherein said fluid dispenser further comprises at least one controllable recirculation valve, said control system being adapted to selectively actuate said at least one controllable recirculation valve and said recirculation pump such that liquid recirculates along said fluid flow path through said fluid dispenser without returning to said fluid storage tank.

10. A fluid dispenser as in claim 8, further comprising a fluid inlet along said fluid flow path for ingress of an evacuation fluid.

11. A fluid dispenser as in claim 10, wherein said fluid dispenser further comprises at least one controllable recirculation valve, said control system being adapted to selectively actuate said at least one controllable recirculation valve and said recirculation pump, such that liquid is evacuated from said fluid conduit and returned to said fluid storage tank.

12. A fluid dispenser as in claim 1, further comprising a pump controlled by a motor positioned within said housing to draw liquid from said at least one fluid storage tank.

13. A fluid dispenser for dispensing fluid from at least one fluid storage tank into a vehicle, comprising:
   a housing in which fluid flow control components are located;
   a control system;

a first fluid conduit completing a first flow path between said at least one fluid storage tank and a nozzle coupled to said housing;

a second fluid conduit completing a second flow path between said nozzle and said at least one fluid storage tank;

at least one controllable valve located along said second flow path;

wherein the temperature of flowing fluid is conditioned upstream of a fluid flow meter inside said fluid dispenser housing, the fluid is diesel exhaust fluid and or liquid fuel; and said control system is adapted to selectively actuate said at least one controllable valve such that said flowing fluid flows to said at least one fluid storage tank when said fluid dispenser is not in use.

14. A fluid dispenser as in claim 13, wherein the temperature of said flowing fluid is conditioned by a temperature conditioning subsystem, said temperature conditioning subsystem comprising a heating device.

15. A fluid dispenser as in claim 13, wherein the temperature of said flowing fluid is conditioned by a temperature conditioning subsystem, said temperature conditioning subsystem comprising a cooling device.

16. A fluid dispenser as in claim 13, further comprising at least one thermometric probe along at least one of said first and second flow paths, said at least one thermometric probe in electronic communication with said control system.

17. A fluid dispenser as in claim 16, wherein the temperature of said flowing fluid is conditioned by a temperature conditioning subsystem, said control system being adapted to selectively operate said fluid temperature conditioning subsystem upon detection of a predetermined temperature.

18. A fluid dispenser as in claim 13, wherein said first and second flow paths are in fluid communication with a flow manifold in said fluid dispenser housing.

19. A fluid dispenser as in claim 13, further comprising a dual-channel hose extending between said housing and said nozzle, said dual-channel hose defining first and second separate flow channels allowing flow in both directions.

20. A fluid dispenser as in claim 19, further comprising a bypass valve providing fluid communication between said first and second flow channels in said hose when said bypass valve is open.

21. A fluid dispenser for dispensing fluid from at least one fluid storage tank into a vehicle, comprising:
a housing in which fluid flow control components are located;
a control system;
a first fluid conduit adapted for fluid communication with a nozzle, said first fluid conduit completing a first flow path through said fluid dispenser;
a second fluid conduit adapted for fluid communication with said nozzle, said second fluid conduit completing a second flow path through said fluid dispenser;
a junction at which said first fluid conduit and said second fluid conduit are in fluid communication with each other, said junction being spaced apart from said nozzle;
said junction further defining an inlet for fluid communication with said at least one fluid storage tank;
a valve in fluid communication with said inlet upstream of said junction; and
a recirculation pump coupled to said second fluid conduit;
said control system being operative to actuate said valve and said recirculation pump such that fluid recirculates through said housing when said fluid dispenser is not in use, wherein the fluid is diesel exhaust fluid and or liquid fuel.

22. A fluid dispenser for dispensing a first fluid from at least one fluid storage tank into a vehicle, comprising:
a housing in which fluid flow control components are located;
a control system;
a first fluid conduit completing a first flow path between said at least one fluid storage tank and a nozzle;
a second fluid conduit completing a second flow path between said nozzle and said at least one fluid storage tank;
a first controllable valve located along said first flow path;
a fluid inlet for an evacuation fluid, said fluid inlet located along said first flow path downstream of said first controllable valve; and
a recirculation pump coupled to said second flow path;
said control system being operative to close said first controllable valve and cause a first fluid to be evacuated from said first and second fluid conduits when said fluid dispenser is not in use by a flow path from said first fluid conduit to said second fluid conduit and back to said at least one fluid storage tank, wherein the fluid is diesel exhaust fluid and or liquid fuel.

23. A method of measuring the flow rate of a fluid in a fluid dispenser for dispensing fluid to a vehicle in a fueling environment, comprising the steps of:
providing a fluid dispenser defining a fluid conduit connectable to a fluid flow path between at least one fluid storage tank and a nozzle coupled to said fluid dispenser;
providing a fluid flow meter located along said fluid flow path;
providing a fluid temperature conditioning subsystem positioned in housing of said fluid dispenser, said fluid temperature conditioning subsystem located along said fluid flow path upstream of said fluid flow meter and downstream of a shear valve;
measuring the temperature of said fluid;
comparing the temperature of said fluid to a predetermined temperature; and
if the temperature of said fluid differs from said predetermined temperature, conditioning the temperature of said fluid upstream of said fluid flow meter, wherein the fluid is diesel exhaust fluid and or liquid fuel.

* * * * *